Jan. 16, 1962

A. C. MORICCA ETAL 3,017,571

DEVICE FOR TESTING REACTANCES

Filed Dec. 4, 1956

INVENTORS.
ANTHONY C. MORICCA
SAMUEL A. MORICCA
CARL E. BOHN

BY

*Albert L. Jeffers*

ATTORNEY

3,017,571
DEVICE FOR TESTING REACTANCES

Anthony C. Moricca, 447 W. Butler; Samuel A. Moricca, 445 W. Butler; and Carl E. Bohn, 2516 Dodge, all of Fort Wayne, Ind.
Filed Dec. 4, 1956, Ser. No. 626,136
8 Claims. (Cl. 324—51)

The present invention relates to a method and device for testing reactances and more particularly to a method and device for determining whether or not a reactance is defective in some particular such as being open or shorted.

Up to the date of this invention, only elaborate and relatively expensive impedance measuring devices have been available for determining whether or not an inductor or capacitor is defective.

It is, therefore, an object of this invention to provide a simple and relatively inexpensive method and device which may be used in combination with an oscilloscope for providing an indication of an imperfect or defective inductance. Such inductance may take the form of air core or iron core inductors, transformer windings, television tube yokes, and other types of inductive components commonly used in the radio and television arts.

It is another object of this invention to provide a method and device which may be alternatively used in distinguishing imperfect or defective capacitors as well as inductors.

Other objects of this invention will become apparent from the following description.

In accordance with this invention, there is provided a reactance testing device comprising a transformer, a series-connected rectifier, resistor, and capacitor connected in shunt across the transformer, a gaseous discharge device shunt-connected across the capacitor for providing a relaxation oscillator, two terminals connected to opposite sides of the gaseous discharge device, and a series-connected inductor and capacitor connected across the two terminals, either the last-mentioned inductor or capacitor being the component under test, the remaining component being considered as the standard. An oscilloscope as an indicating device, may be coupled across the two terminals as well as across the inductor and capacitor individually for obtaining a display of the resonant signal produced by the series-connected inductor and capacitor when they are shock-excited by the relaxation oscillator.

To the accomplishment of the above and related objects, the invention may be embodied in the form illustrated in the accompanying drawings, attention being called to the fact, however, that the drawings are illustrative only, and that the specific change may be made in the specific design illustrated and described, so long as the scope of the appended claims is not violated.

Figure 1:
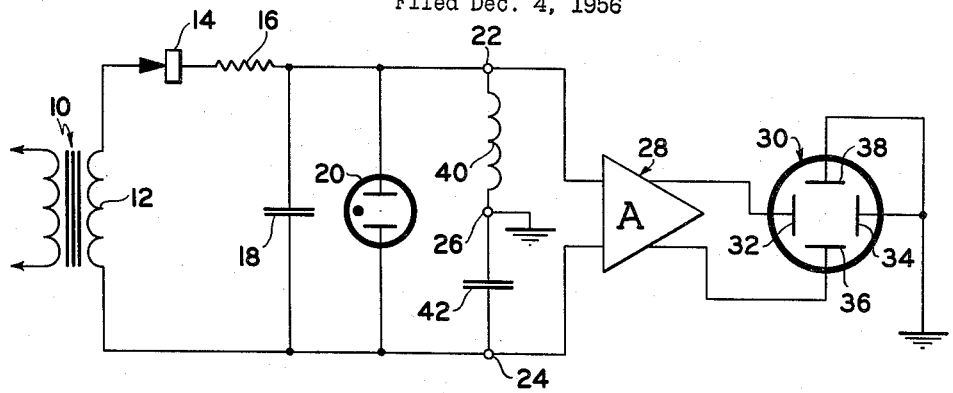
FIGURE 1 is a circuit diagram of one embodiment of this invention.

Referring to the drawings, a transformer 10 has connected in a series with the secondary winding 12 a selenium rectifier 14, a resistor 16 and capacitor 18. A gaseous discharge device or neon tube 20 is shunt-connected across capacitor 18 and provides in combination with the circuit elements 16 and 18 a relaxation oscillator. Two terminals 22 and 24 are connected to the opposite sides, respectively, of the neon tube 20, and a third terminal 26 is grounded. Coupled to these terminals 22, 24 and 26 is an oscilloscope of conventional design which is composed of a suitable amplifier 28 and a display or cathode-ray tube 30 having the usual deflecting plates 32, 34, 36 and 38. The amplifier 28 may or may not be needed, but in some instances, it will be preferable to amplify the signal derived from the terminals 22 and 24 before applying these signals to the tube 30.

The terminal 26 as well as the deflection plates 34 and 38 is grounded as shown.

The inductor or capacitor to be tested by this invention is indicated, respectively, by the reference numerals 40 and 42. In the instance in which the invention is to be used for testing inductors, the capacitor 42 becomes the standard component and will, of course, need to be a properly operating or perfect component. The word "perfect" is not used in the sense of requiring perfection in the construction and operation of the component, but is intended to mean that the component will operate as a capacitor without being shorted or open circuited. The inductor 40, therefore, is the component to be tested, and as will appear from the following, the waves of FIGURES 2 and 3 as they may appear on the screen of the display tube 30 will indicate whether the inductor is good or bad.

Assuming that the inductor 40 possesses no defects or imperfections which would prevent it from operating as an inductor, the condenser 18 charges in response to voltage built up by the positive cycle of the alternating voltage which is supplied to and rectified by the rectifier 14. Assuming this alternating voltage to be that conventionally available, in other words, 110 volts at 60 cycles, the condenser 18 will be charged essentially to the peak amplitude of the voltage supplied by the secondary of transformer 12. However, by proper selection of circuit parameters, the neon tube 20 fires just prior to the capacitor 18 reaching this peak value, for example, 100 volts, whereupon, the voltage between points 22 and 24 collapses, that is, the series circuit 40, 42 discharges through tube 20. This series circuit is thereby shock-excited and will produce an oscillatory voltage or ringing signal at its resonant frequency. An oscillatory voltage thereupon appears across the coil 40 and another across condenser 42; the coil 40 voltage is applied between the plates 32 and 34 and the condenser 42 voltage is applied between plates 36 and 38 of the oscilloscope. The frequency of this resonance is not important to this invention.

The oscillatory voltage produced across the series circuit 40, 42 decays or is damped at a rate dependent upon the losses in the oscillatory circuit, i.e., series circuit 40, 42 and tube 20. Any damped oscillatory voltage is non-sinusoidal thus being the sum of undamped frequency components, and the oscillatory voltage across 40, 42 by virtue of the presence of the gas discharge tube 20 in the oscillatory circuit, which is a non-linear device, has many frequency components. During the oscillatory period, i.e., between initial firing of tube 20 and the next succeeding positive half cycle of the applied voltage which causes rectifier 14 again to conduct, thereby to charge capacitor 18 and 42 to initiate a new oscillatory period, the voltages at terminals 22 and 24 respectively with reference to grounded point 26 are both 90° displaced from the current in the series circuit and in phase. The voltage developed across an inductance is expressed as $E_L = IZ_L = I2\pi fL$ where I is the current, $Z_L$ is the impedance of the inductance, $f$ the frequency, and L the inductance in henries. Likewise, the voltage across a capacitor is expressed as $$E_C = IZ_C = \frac{I}{2\pi fC}$$

where $Z_C$ is the impedance of the capacitor and C its capacitance in farads. It will thus be self-evident that when the damped oscillatory current which is the summation of many undamped frequency components flows in the series circuit 40, 42, the voltage developed across inductance 40 will be responsive to the higher frequency components and will be damped, and the voltage developed across capacitor 42 will be responsive to the lower frequency components. Thus, the voltage developed across inductance 40 and in turn impressed on horizontal deflection plates 32, 34 of tube 30 is a damped voltage with the high frequency components providing the highest amplitude, while the low frequency components provide the highest amplitude in the voltage across capacitor 42 which is in turn impressed on vertical deflection plates 36, 38. These two voltages thus provide the trace on tube 30 shown in FIGS. 2 and 3, the higher frequency voltage components being impressed on the horizontal deflection plates 32, 34 to provide the horizontal sweep and the lower frequency voltage components being impressed on the vertical deflection plates 36, 38 to provide the vertical sweep.

Figure 2:
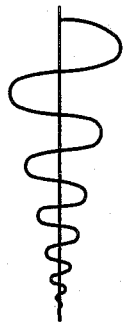
FIGURES 2 and 3 are wave-form patterns produced by the oscilloscope in response to perfect and imperfect, respectively, inductive or capacitive components.

This oscillatory voltage or ringing signal is coupled to and displayed by the cathode ray tube 30 in the form of FIGURE 2 which depicts an ordinary damped sine wave.

Figure 3:
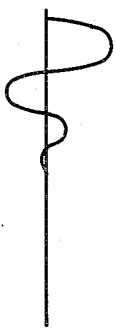

If the inductor 40 under test is short circuited, the decay of oscillations is relatively rapid as shown in FIGURE 3. Thus, if the wave of FIGURE 2 is obtained, the inductor 40 is indicated as being free from defects. On the other hand, if the display is that of FIGURE 3, the inductor is imperfect and should either be repaired or discarded.

In order to observe the decay characteristics of the oscillator wave, a sweep should be applied to the vertical deflection plates 36 and 38. While almost all oscilloscopes commercially available are provided with sweep circuits, the invention provides its sweep independently due to the action of the above stated low frequency voltage components developed across capacitor 42.

During the period of conduction of the rectifier 14 just prior to the neon tube 20 firing, almost all of the voltage across capacitor 18 appears also across capacitor 42. As this voltage builds up, the deflecting plate 36 becomes progressively more negative as against the plate 38. When the neon tube 20 fires, capacitor 18 is short circuited and the voltage across capacitor 42 collapses except for the low frequency components of the superimposed ringing or oscillatory voltage. As the source voltage changes in polarity, that is, shifts from its positive half cycle to its negative half cycle, the rectifier 14 acts as an open circuit and disconnects the remaining circuitry from the transformer 10 thus permitting the damped oscillation to continue until tube 20 is extinguished. As the result, the pattern observed on the oscilloscope appears as that in FIGURE 2, the decayed oscillations being more closely spaced. This indicates that the sweep is non-linear, but this is of no consequence as the invention is not intended to be a measuring device but only a testing device for indicating whether or not the component is good or bad.

For circuit parameters to be listed hereinafter, about twenty (20) cycles in the wave of FIGURE 2 indicates an inductor free of defects. If the inductor is short circuited, only one (1) to three (3) cycles will appear as shown in FIGURE 3. If the inductor is open circuited, the oscillations will be missing entirely. If it is desired to use the invention for testing capacitors, an inductor 40 free of defects is permanently connected into the circuitry whereupon the capacitor 42 becomes the component under test. If the capacitor 42 exhibits excessive leakage, the wave pattern of FIGURE 3 is obtained. Hence, the invention provides means not only for testing inductors, but may be used for testing any reactive component.

Since the circuit 16, 18 and 20 operates as a relaxation oscillator, it will obviously appear that similar circuits which will produce waves with steep wave fronts may be used such as multivibrators or blocking oscillators. The production of a signal which shock-excites the circuit 40, 42 under test is the primary requirement.

While particular values of circuit components are given in the following for an operative embodiment of this invention, it will be understood that these values are given as exemplary only and are not intended to be definitive as to the scope of the invention or claims.

Transformer 10 _____ 110 v./125 v./60 cycle.
Resistor 16 _____ 100,000 ohms.
Capacitor 18 _____ 0.1 mfd.
Capacitor 42 _____ 0.01 mfd.

What we claim to be new and desire to protect by Letters Patent of the United States is:

1. A reactance-testing device comprising a source of alternating current, a series-connected rectifier, resistor and capacitor connected in shunt across said source, a gaseous discharge device shunt connected across said capacitor thereby providing a relaxation oscillator, two terminals connected to opposite sides of said gaseous discharge device, a second capacitor having two leads, one lead being connected to one terminal, the remaining lead and the other terminal providing an open circuit across which a reactance to be tested may be connected, an oscilloscope having horizontal and vertical deflecting means, one of said deflecting means being operatively coupled across said second capacitor, and the other of said deflecting means being operatively coupled across said open circuit.

2. The device of claim 1 wherein an inductor is connected across said open circuit.

3. A reactance-testing device comprising a gaseous discharge device and a charging capacitor connected in parallel, means for charging said capacitor to a value of voltage which exceeds the breakdown voltage of said gaseous discharge device, two terminals connected to opposite sides of said gaseous discharge device, a second capacitor having two leads, one lead being connected to one terminal, the remaining lead and the other terminal providing an open circuit across which a reactance to be tested may be connected, an oscilloscope having horizontal and vertical deflecting means, one of said deflecting means being operatively coupled across said second capacitor, and the other of said deflecting means being operatively coupled across said open circuit.

4. The device of claim 3 wherein an inductor is connected across said open circuit.

5. A reactance-testing device comprising a source of unidirectional voltage having an output circuit, a gaseous discharge device coupled across said output circuit, two terminals connected to opposite sides of said gaseous discharge device, a capacitor having two leads, one lead being connected to one terminal, the remaining lead and the other terminal providing an open circuit across which a reactance to be tested may be connected, an oscilloscope having horizontal and vertical deflecting means, one of said deflecting means being operatively coupled across said capacitor, and the other of said deflecting means being operatively coupled across said open circuit.

6. The device of claim 5 wherein an inductor is connected across said open circuit.

7. A reactance-testing device comprising a wave generator which produces a periodically occurring shock-exciting wave having a decaying trailing edge, said generator having two output terminals, a capacitor having two leads, one lead being connected to one terminal, the remaining lead and the other terminal providing an open circuit across which a reactance to be tested may be connected, an oscilloscope having horizontal and vertical deflecting means, one of said deflecting means being operatively coupled across said capacitor, and the other of said deflecting means being operatively coupled across said open circuit.

8. The device of claim 7 wherein an inductor is connected across said open circuit.

References Cited in the file of this patent

UNITED STATES PATENTS

| | | |
|---|---|---|
| 1,482,462 | Dubsky | Feb. 5, 1924 |
| 2,235,667 | Blount et al. | Mar. 18, 1941 |
| 2,321,424 | Rohats | June 8, 1943 |
| 2,355,363 | Christaldi | Aug. 8, 1944 |
| 2,457,136 | Earp | Dec. 28, 1948 |
| 2,697,559 | Scarce | Dec. 21, 1954 |
| 2,815,481 | Rohats | Dec. 3, 1957 |

FOREIGN PATENTS

| | | |
|---|---|---|
| 911,553 | France | July 12, 1946 |

OTHER REFERENCES

Waidelich: Proceedings of the I.R.E., vol. 32, No. 6, June 1944, pp. 339–348.

Du Mont: Oscillographer, vol. 7, No. 2, March–April, 1945, pages 1–4.